(12) United States Patent
Poblete et al.

(10) Patent No.: US 11,347,675 B2
(45) Date of Patent: May 31, 2022

(54) SYSTEM AND METHOD FOR DYNAMICALLY CONFIGURING STORAGE MAPPING

(71) Applicant: DELL PRODUCTS, LP, Round Rock, TX (US)

(72) Inventors: Christopher Abella Poblete, Austin, TX (US); Santosh Kumar Bidaralli, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 9 days.

(21) Appl. No.: 16/793,396

(22) Filed: Feb. 18, 2020

(65) Prior Publication Data
US 2021/0255983 A1   Aug. 19, 2021

(51) Int. Cl.
*G06F 13/00* (2006.01)
*G06F 13/40* (2006.01)
*G06F 3/0481* (2022.01)

(52) U.S. Cl.
CPC ........ *G06F 13/4081* (2013.01); *G06F 3/0481* (2013.01)

(58) Field of Classification Search
USPC ............. 710/300–302, 8–10, 13, 74, 1, 100; 718/104
See application file for complete search history.

(56) References Cited

U.S. PATENT DOCUMENTS

| | | | |
|---|---|---|---|
| 6,285,967 B1* | 9/2001 | Rajan | G06F 11/273 700/115 |
| 9,780,960 B2 | 10/2017 | Bidaralli et al. | |
| 2001/0049800 A1* | 12/2001 | Suzuki | G06F 3/0601 714/6.2 |
| 2012/0185590 A1* | 7/2012 | Kolin | H05K 7/20836 709/224 |
| 2012/0226986 A1* | 9/2012 | Eischeid | G06F 11/3006 715/736 |
| 2013/0080893 A1* | 3/2013 | Chari | G06F 3/0481 715/712 |
| 2013/0281132 A1 | 10/2013 | Poblete | |

(Continued)

OTHER PUBLICATIONS

Poblete et al., U.S. Appl. No. 16/710,578 entitled 'System and Method for Improving Thermal Performance of an Information Handling System' filed Dec. 11, 2019.

(Continued)

*Primary Examiner* — Ilwoo Park
(74) *Attorney, Agent, or Firm* — Larson Newman, LLP (57) ABSTRACT

A system includes a first embedded controller to manage a management interface of a mobile device. A second embedded controller manages a display panel at the system. The first embedded controller receives a first event notification of an insertion of a sled in the system, and determines a pending storage mapping associated with the sled. The first embedded controller displays, at the management interface, information associated with the pending storage mapping associated with the sled. The second embedded controller generates a graphical user interface with information associated with the pending storage mapping associated with the sled. The graphical user interface is updated in response to user input.

20 Claims, 6 Drawing Sheets

(56) References Cited

U.S. PATENT DOCUMENTS

2015/0169338 A1* 6/2015 Chandrasekhar ..... G06F 9/5077
718/104
2015/0169490 A1* 6/2015 Roberts ............... G06F 13/4068
710/301
2019/0310951 A1 10/2019 Mugunda et al.

OTHER PUBLICATIONS

Brown et al., U.S. Appl. No. 16/712,127 entitled 'System and Method for Automated Management Access Point Network Connection' filed Dec. 12, 2019.

* cited by examiner

SYSTEM AND METHOD FOR DYNAMICALLY CONFIGURING STORAGE MAPPING

FIELD OF THE DISCLOSURE

The present disclosure generally relates to information handling systems, and more particularly relates to dynamic storage mapping configuration.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system includes a first embedded controller to manage a management interface of a mobile device. A second embedded controller manages a display panel at the system. The first embedded controller receives a first event notification of an insertion of a sled in the system, and determines a pending storage mapping associated with the sled. The first embedded controller displays, at the management interface, information associated with the pending storage mapping associated with the sled. The second embedded controller generates a graphical user interface with information associated with the pending storage mapping associated with the sled. The graphical user interface is updated in response to user input.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
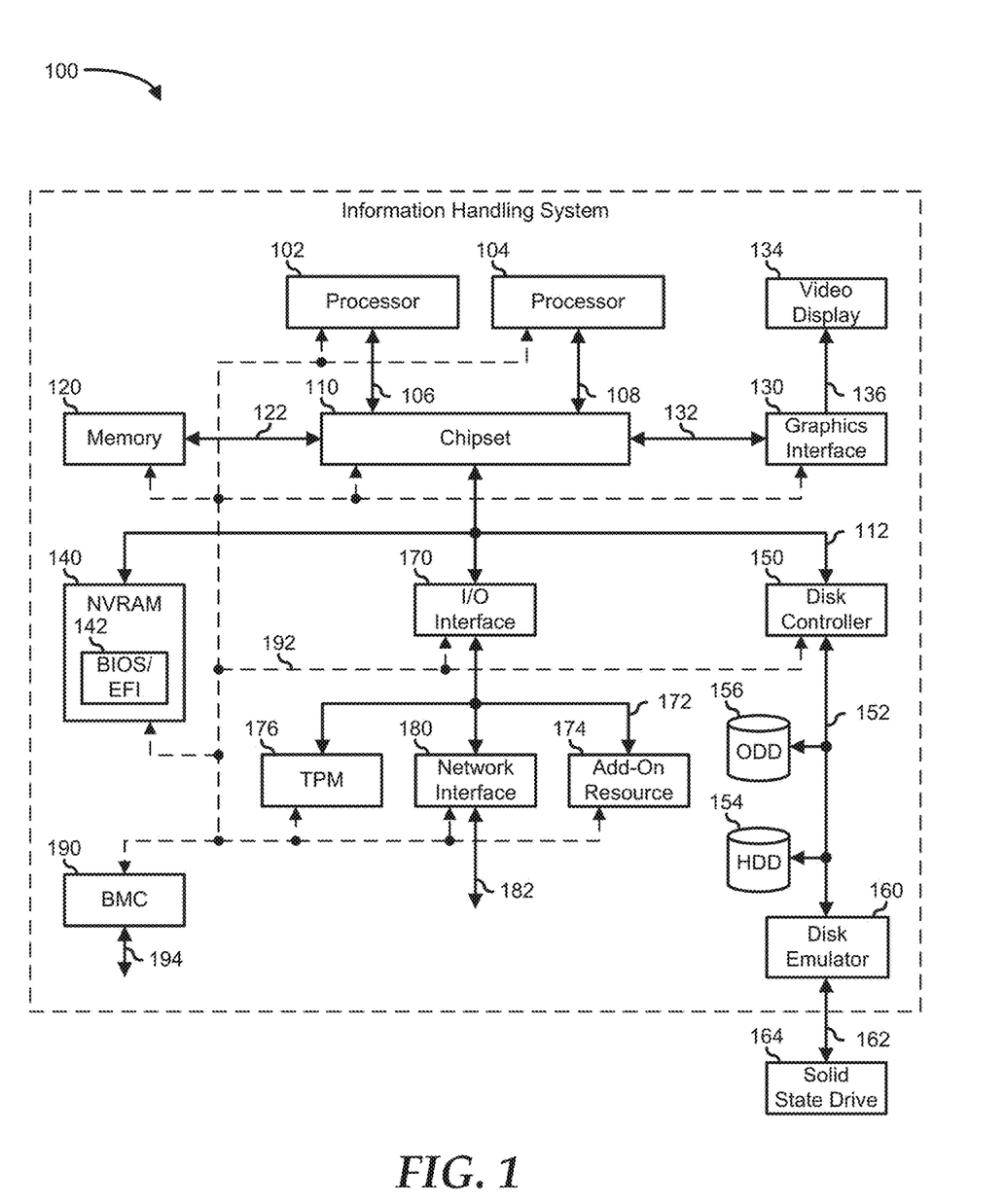
FIG. 1 is a block diagram illustrating an information handling system, according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Shared infrastructure-based compute, storage, and networking products such as a rack chassis offers front access to quickly swap compute sleds and/or storage sleds. When swapping the compute sleds and/or the storage sleds it is desirable to manage current configurations such as storage mapping, which allows the compute sleds to store data in specific storage sleds and/or specific storage devices in the storage sleds. If these storage mappings are not managed properly then data might be lost. As such the chassis may include a management console, also referred to as a management interface, that provides features associated with storage mapping configuration. The management interface may allow a user to select a storage sled and assign it to a compute node, a compute sled, or a compute slot. If the drives in the storage sled were previously assigned to a different compute sled, this operation will override the previous assignments or mapping and assign the drives in the storage sled to the different compute sled. Also, when assigning the storage sled away from the compute sled that is powered on, the user will face potential data loss if proper steps are not taken to flush the data in the host operating system of the compute node. Thus, determining whether there is a potential data loss and warning the user regarding the potential data loss is desirable prior to a storage mapping re-assignment among others.

The present system and method determine whether there is a current storage mapping configuration associated with the compute sled and/or storage device during the swap. The user may be provided with the ability to accept or discard the current storage mapping configuration. In addition, the present system and configure determine whether there is a re-assignment of a storage mapping with a potential data loss. The above information among others may be communicated to the user via at-the box notification and storage mapping configuration graphical user interface without logging in to the management interface which may be cumbersome or inefficient especially when the user is swapping multiple compute sleds and/or storage sleds. Based on the information provided in the graphical user interface, the user may also take one or more actions to mitigate data loss at-the-box. For example, the user may deny the re-assignment of the storage mapping via the graphical user interface.

Figure 2:
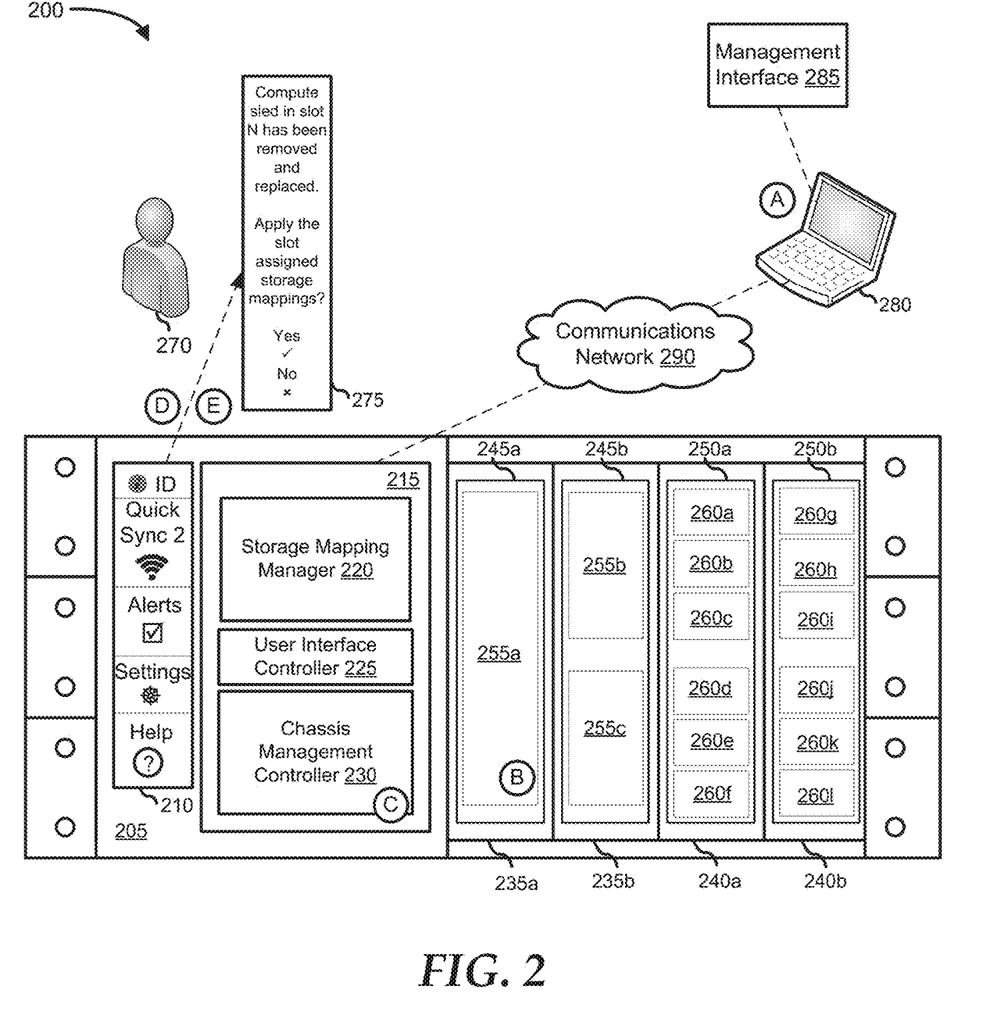
FIG. 2 is a block diagram illustrating an example of a system for dynamically configuring storage mapping, according to an embodiment of the present disclosure.

FIG. 2 shows a system 200 for dynamically configuring storage mapping at-the-box. System 200 includes a chassis 205 that houses or contains multiple information handling systems. System 200 also includes a user 270, a notification 275, and a mobile device 280 with a management interface 285. Chassis 205 is configured to include a number of modular processing components that are provided in a common frame that is the chassis. As such, chassis 205 may be a modular enclosure with front-accessible slots that holds multiple sleds such as compute sleds and storage sleds connected by an I/O fabric. This allows a user, such as an information technology administrator, for example to swap the compute sleds and the storage sleds. In addition, the information technology administrator can swap and/or add storage devices to the storage sleds. Chassis 205 can accept a storage sled in a front storage slot. For example, chassis 205 can accept storage sled 250a in storage slot 240a and storage sled 250b at storage slot 240b. Chassis 205 can also accept a compute sled in a front compute slot. For example, chassis 205 can accept compute sled 245a at compute slot 235a and compute sled 245b at compute slot 235b.

A compute sled may be a single node compute sled or multiple nodes compute sled. For example, compute sled 245a includes a compute node 255a while compute sled 245b includes compute node 255b and compute node 255c. A compute node may also be referred to as a computer system or an information handling system similar to information handling system 100. A compute sled may have its own corresponding BMC 190 also referred to as an embedded controller or a service processor which interfaces with chassis management system 215 to provide side-band and out-of-band remote management (such as according to the Intelligent Platform Management Interface (IPMI) specification). The BMC 190 has one or more physical communications links and interfaces to the chassis management system 215, thus allowing the BMC 190 to process messages according to the IPMI specification. The BMC 190 may thus monitor and remotely report the functions and performance of the corresponding compute node and/or compute sled via a separate network interface to a communications network 290. BMC 190 and the IPMI specification are generally well known and thus need not be explained in detail.

Communications network 290 includes a Transport Control Protocol/Internet Protocol (TCP/IP) network such as the Internet or an intranet. A storage sled may include one or more storage devices. Examples of the storage devices include HDDs, optical disks, magneto-optical disks, SSDs, and/or a variety of other storage devices known in the art. As shown, storage sled 250a includes storage devices 260a-260f while storage sled 250b includes storage devices 260g-206l.

Chassis management system 215 may be configured to control chassis power, cooling, and physical user interfaces such as user interface panel 210 and management interface 285. Chassis management system 215 may include a chassis management controller 230, a user interface controller 225, and a storage mapping manager 220. Chassis management controller 230 may be embedded controller or a service processor and may be configured to receive notifications from individual components such as a compute sled and/or a storage sled whenever the component is inserted such as added, removed, and/or replaced. Chassis management controller 230 may also be configured to determine machine-specific information such as storage mappings, storage configurations, service tags, etc. in order to properly operate the inserted compute sled or the inserted storage sled before powering up the inserted compute sled or the inserted storage sled. In one embodiment, chassis management controller 230 may broadcast a notification to a power management module and/or storage mapping manager 220 which may be configured to determine whether to power on the component associated with the event notification. In another embodiment, chassis management controller 230 is configured to determine whether to power on the component. Although chassis management system 215 is shown to include one chassis management controller, chassis management system 215 may include more than one chassis management controller, wherein the chassis management controllers are communicatively coupled to each other. Further, information such as regarding storage mapping configuration of the inserted compute sled and/or the inserted storage sled may be synchronized between the chassis management controllers. In addition, the one or more chassis management controllers may be communicatively coupled to each BMC of each compute node in the chassis.

Chassis management controller 230 may provide a secure browser-based interface such as management interface 285 via user interface controller 225. Management interface 285 may be a graphical user interface or a command line interface that enables an information technology administrator to take inventory, perform configuration and monitoring tasks, remotely power on/off blade servers and enable alerts for events on servers and components in the blade chassis. Examples of management interface 285 include a web interface, a RACADM command-line interface, Redfish, and WSMan, etc. Chassis management controller 230 may also provide user interface panel 210. User interface panel 210 may be a touchscreen liquid crystal display (LCD) panel at the front of chassis 205 allowing it to be exposed and be accessible to the user for inspection and service. User interface panel 210 may be connected to, coupled to, or commanded by chassis management controller 230 via user interface controller 225 to generate and display a graphical user interface such as notification 275 which visually displays an alert or a notification for the user. In addition, notification 275 may include one or more options for the user to take action. In another embodiment, user interface panel 210 may be connected to, coupled to, or commanded by chassis management controller distinct from chassis management controller 230. As such, user interface panel may also be communicatively coupled with a user interface controller distinct from user interface controller 225, wherein the user interface controller generates the graphical user interface instead of user interface controller 225.

Storage mapping manager 220 may manage the storage mappings associated with the compute sleds and storage sleds and/or each one of the storage devices in the storage sleds such as assigning the storage mappings and/or resolving pending storage mappings. The storage mapping allows the compute sleds to use the storage devices in the storage sleds to store its data. Several storage mapping configurations are available. For example, a storage sled may be mapped to a compute sled. One or more storage devices in the storage sled may be mapped to the compute sled. One or more storage devices in the storage sled may be mapped to one or more compute nodes in the compute sled. Further, the compute node and/or the compute sled may be mapped to more than one storage sled. Also, one or more storage devices and/or the storage sled may be mapped to different compute sleds. In addition, one or more storage sleds may be mapped to one or more compute sleds.

User 270 may perform storage mapping configuration using management interface 285 such as when inserting a brand-new sled. In addition, user 270 may perform at-the-box storage mapping resolution such as when replacing a compute sled. If a currently mapped compute sled or storage sled is removed and replaced, chassis management controller 230 and/or storage mapping manager 220 may determine whether the current storage mapping may be reinstated before powering up the compute sled or storage sled. For example, compute node 255*a* in compute sled 245*a* may be mapped to storage devices 260*a* and 260*b* at storage sled 250*a*. If compute sled 245*a* is removed from compute slot 235*a* and reinserted in the same compute slot, then the mapping may be reinstated without user interaction and compute sled 245*a* is powered on. This is because chassis management system 215 may determine that the same compute sled is reinserted in the same compute slot via a service tag and/or other information, thus there is no change in the current storage mapping configuration.

Chassis management controller 230 and/or storage mapping manager 220 may via user interface controller 225 provide options to user 270 on whether to select or clear a pending storage mapping, which is a storage mapping that may require a resolution. In an example, when a user removes a storage sled from one storage slot and inserts the storage sled into a different storage slot on the same chassis, storage mapping manager 220 may determine whether to re-apply or clear the storage mapping. In this example, storage mapping manager 220 may request the user's input via user interface panel 210. In another example, if the user replaces the storage sled in a storage slot with a different storage sled that is not associated with any storage mapping, the storage mapping manager may apply the storage mapping associated with the storage slot to the replacement storage sled automatically. In yet another example, if the user re-assigns hard drive(s) from a compute sled that is powered on, there is an issue of a potential data loss. In this regard, storage mapping manager 220 may warn the user regarding the potential data loss prior to completing the re-assignment.

As discussed above, user interface panel 210 is configured to display and provide options for the user when there is an issue of potential data loss due to re-assignment or issues with the current storage mapping. The user may decide whether to accept or clear the storage mapping and make an appropriate selection which would then allow the compute sled to finish the boot process or the storage sled to power up. User interface panel 210 may also display a warning message based on the selection(s) of the user. For example, a warning message may be displayed in user interface panel 210 when the user is re-assigning one or more hard drives that were initially assigned to specific compute sleds that are powered on.

Chassis management controller 230 and/or storage mapping manager 220 may be configured to maintain a queue of the pending storage mappings waiting for user 270 to accept or clear. An un-applied storage mapping assignment that is waiting for a resolution and/or user action may be referred herein as a pending storage mapping assignment or simply pending storage mapping. The first pending storage mapping in the queue may be displayed in the user interface panel 210 and/or management interface 285. After user 270 accepts or clears the first pending storage mapping in the queue, user interface controller 225 may synchronize with chassis management controller 230 and/or storage mapping manager 220 and clear the current display in user interface panel 210. In addition, chassis management controller 230 may also synchronize with management interface 285 and clears the display in mobile device 280 associated with the pending storage mapping. User interface controller 225 may then display the second pending storage mapping in the queue at user interface panel 210. Subsequent storage mapping requests are added to the queue in order of the request. For example, user 270 may replace compute sled 245*b* in compute slot 235*b* before accepting or clearing the pending storage mapping associated with compute sled 245*a*. After the last pending storage mapping in the queue has been handled by user 270, user interface panel 210 displays a home page menu.

If user 270 takes an action or selects an option at management interface 285, then user interface controller 225 may synchronize with chassis management controller 230 and/or storage mapping manager 220 and dynamically change the page displayed in user interface panel 210 accordingly. In one embodiment, the current system and method dynamically changes the notification associated with the current pending storage mapping displayed in user interface panel 210 when user 270 takes an action through management interface 285 even though management interface 285 is running on a different chassis management controller than chassis management controller 230 and/or user interface controller than user interface controller 225. For example, if the user input is received via management interface 285 that is managed by a first management controller, then the first management controller may send a notification to a second management controller, wherein the second management controller manages a display or front control panel on the front of the chassis such as user interface panel 210. In response to receiving the notification, the second management controller updates the notification in the display panel based on the user input. In another example, if the user input is received via user interface panel 210, the second management controller may send a notification to the first management controller. The first management controller updates management interface 285 accordingly. In other words, the first management controller and the second management controller synchronizes with each other in order to display unified or similar information in the management interface and the display panel.

FIG. 2 is annotated with a series of letters A-E. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, user 270 assigns storage sled 250*a* to compute sled 245*a* via management interface 285 using mobile device 280. As shown, storage sled 250*a* is in storage slot 240*a* while compute sled 245*a* is in compute slot 235*a*. Management interface 285 may be a unified web/representational state transfer (REST)ful API that manages compute, storage, and networking components in chassis 205.

At some point at stage B, the user replaces compute sled 245*a* with a different compute sled. In this example, the different compute sled has a different service tag than compute sled 245*a*. At stage C, chassis management controller 230 receives a request for power from the replacement compute sled. When chassis management controller 230 receives the request, chassis management controller 230 determines whether to power on the replacement compute sled. Chassis management controller 230 may determine via storage mapping manager 220 whether there is a potential data loss if the replacement compute sled is powered on. For example, there may be a potential data loss due to a storage mapping assignment associated with the previous compute sled in the compute slot, which is compute sled 245a. If chassis management controller 230 determines that there is a potential data loss, then chassis management controller 230 blocks power to the replacement compute sled and does not allow the replacement compute sled to finish the boot process. Also, storage mapping manager 220 may not apply the storage mapping assignment to the replacement compute sled.

At stage D, chassis management controller 230 sends a notification to user interface controller 225 that power to the replacement compute sled is blocked. Based on the received notification, user interface controller 225 notifies user 270 via user interface panel 210 regarding the pending storage mapping assignment. For example, user interface panel 210 may display a message such as shown in notification 275 which states that "Compute sled in slot 235a has been removed and replaced. Apply the slot assigned storage mappings?" In this example, the pending storage mapping is assigned to the compute slot, thus a compute sled inserted in the compute slot may be assigned with the storage mapping. Notification 275 may also provide an option for user 270 to either "Yes (Accept)" or "No (Clear)" the pending storage mapping. User interface panel 210 may also be configured to provide the user with an option to view details associated with the pending storage mapping and/or to navigate to other pending storage mappings in the chassis.

At stage E, if user 270 selects the "No (Clear)" option, another notification may be displayed which states that "The slot assigned storage mapping will be cleared from slot 235a. Do you wish to continue?" at user interface panel 210. User 270 may select "No" to step back and accept the pending storage mapping instead of clearing or removing it. The selection of user 270 such as to accept or clear the pending storage mapping may be sent to chassis management controller 230 via user interface controller 225. Chassis management controller 230 may also update management interface 285.

At this point, the replacement compute sled may still be powered off. Based on the selection of user 270, chassis management controller 230 may determine whether the new compute sled may be allowed to boot. In addition, the chassis management controller may determine if there is any other pending storage mapping associated with the replacement compute sled that should be addressed by user 270 before the replacement compute sled is powered on and allowed to boot. If there is another pending storage mapping, then storage mapping manager 220 may display the next pending storage mapping to user 270. If there is no other pending storage mapping then storage mapping manager 220 displays the home page to user 270. In another embodiment, user interface panel 210 may be configured to allow a user to choose and interact with a different pending storage mapping other than the one currently displayed. For example, the user may choose an option to display the next pending storage mapping or any other pending storage mapping associated with chassis 205 prior to interacting with notification 275.

The example above shows how chassis management controller handles a particular scenario associated with the storage mapping of a replacement compute sled. In the example above, the storage mapping is assigned to a compute slot which means one or more drives in a storage sled may be assigned to a single node compute sled contained in the compute slot. If the compute sled fails, the drives may remain assigned to the compute slot. Storage mapping may also be assigned to a compute node which means that one or more drives in a storage sled may be assigned to a single node compute sled or a compute node in a multi-node compute sled. Also, one or more drives in a storage sled may be assigned to more than one compute node. In addition, storage mapping may be assigned to a compute sled which means that one or more drives in a storage sled are assigned to a single node compute sled or to all the compute nodes in the compute sled. Storage mapping can also be assigned to a storage enclosure with one or more compute sleds with HBA mini-mezzanine adapter. Using this mode, the user can also assign a storage sled to an empty compute slot. In another scenario, when a user replaces a compute sled associated with one a service tag with a compute sled associated with another service tag, and the storage sleds are mapped to the compute node slot, the power on the replacement compute sled is turned off. The above example may be applied when a storage sled and/or one of the storage devices in the storage sled is replaced.

In yet another scenario, a user may remove a compute sled, containing an HBA controller with shared mappings, and replaces it with a compute sled containing a Dell® PowerEdge RAID™ controller (PERC). The chassis management controller may check the compute sled to ensure that no shared mapping exists. If a shared mapping exists, then the user may be prompted to clear the shared mapping. In addition, the compute sled may be powered off by the chassis management controller. In another example, when a user removes a compute sled containing the PERC with storage mappings and replaces the compute sled with a new compute sled having an HBA controller with a different service tag, a message may be displayed warning the user of potential data loss prompting the user to clear or accept the storage mapping. In this scenario, the new compute sled may be turned on. These examples does not limit the current disclosure. One skilled in the art will readily appreciate that other scenarios are possible and are still within the embodiments of the current disclosure.

Figure 3:
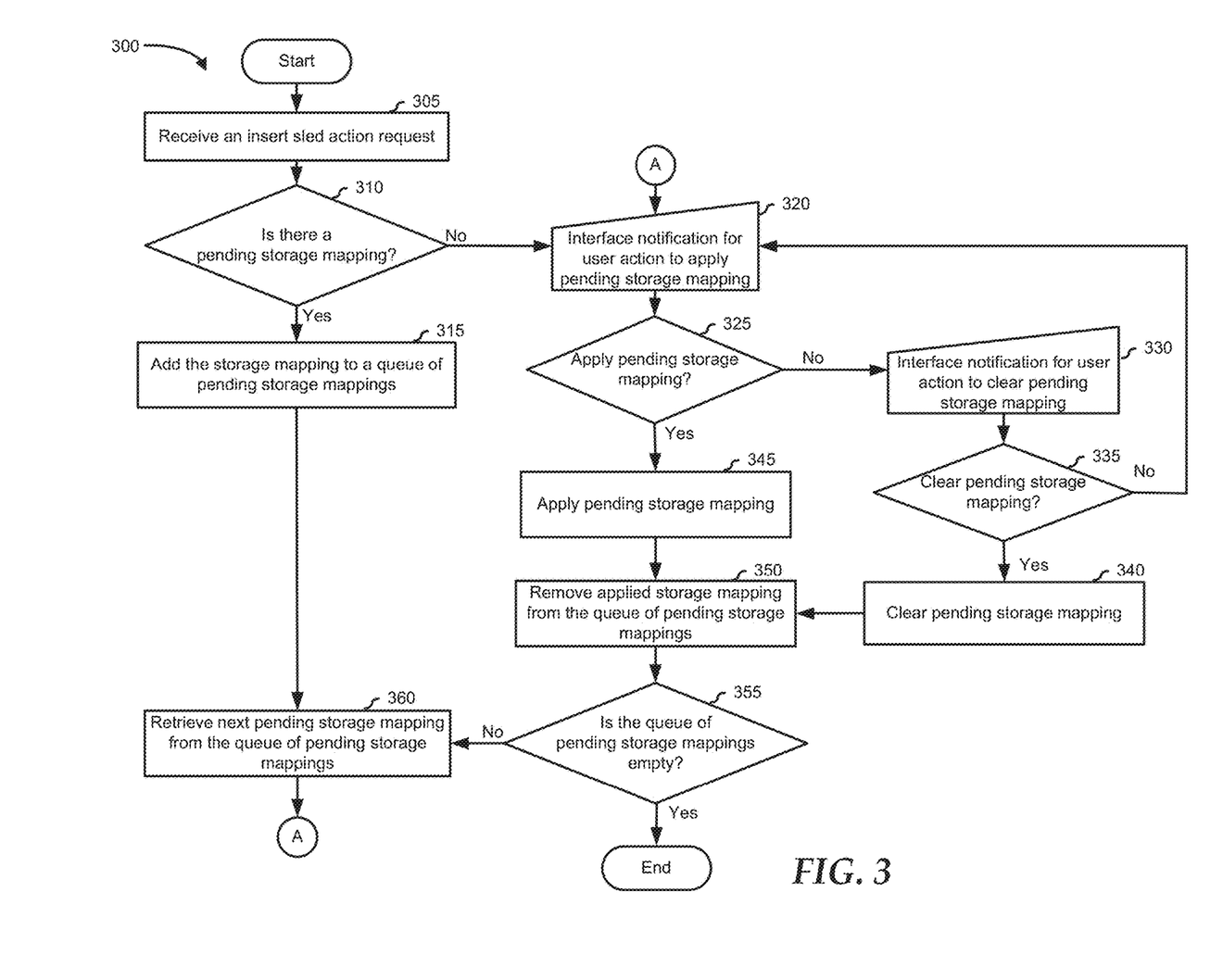
FIG. 3 is a flowchart illustrating an example of a method for dynamically configuring storage mapping, according to an embodiment of the present disclosure.

FIG. 3 illustrates a method 300 for dynamically configuring storage mapping between compute and storage components in a chassis. Method 300 may be performed by one or more components of FIG. 2. Method 300 typically starts at block 305 where the method receives an insert sled action request. An insert sled action request is usually received when an administrator and/or information technology user inserts a component such as a compute sled or a storage sled into a chassis. The insert sled action request may include information associated with the inserted component such as a service tag, processing capability, operating system, etc.

The method proceeds to decision block 310 where the method determines whether there is a pending storage mapping to be resolved. The pending storage mapping to be resolved may be associated with the insert sled action request. The pending storage mapping may be resolved with user interaction. If there is a pending storage mapping to be resolved, then the "YES" branch is taken and the method proceeds to block 315. If there is no pending sled storage mapping to be resolved, then the "NO" branch is taken and the method proceeds to block 320.

At block 315, the method adds the pending storage mapping to a queue of pending storage mappings. The pending storage mapping may be added to the end of the queue of pending storage mappings. The current embodiment illustrates a queue of pending storage mapping actions. However, the pending storage mapping actions may be in one of various data structures such as a list, an array, a stack, a linked list, etc. The method proceeds to block 360.

At block 320, the method generates a notification at a display screen and waits for a user action, also referred to as a user input. The notification may include an onscreen display menu that provides one or more options to the user. The display screen may be implemented using various types of display technology, including, but not limited to, light-emitting diodes (LED), liquid crystal display (LCD), plasma displays, touchscreens, etc. The method may wait for a user input wherein the user input is a selection of an option from the displayed menu. When the user selects a particular option, the method receives the user input from the display screen. The user input may specify whether to apply the pending storage mapping or to clear the pending storage mapping.

After receiving the user input, the method proceeds to decision block 325 where the method determines whether to apply the pending storage mapping or not. If the storage mapping is to be applied, then the "YES" branch is taken and the method proceeds to block 345. If the storage mapping is not to be applied, then the "NO" branch is taken and the method proceeds to block 330.

At block 330, the method generates a notification for the user and waits for a user action. The notification may be an onscreen display at the display screen which shows one or more options for the user. The option may include selecting whether to clear the assigned storage mapping or not. After receiving the user action, the method proceeds to decision block 335, where the method determines whether to clear the storage mapping or not. If the assigned storage mapping is to be cleared, then the "YES" branch is taken and the method proceeds to block 340 where the method clears the pending storage mapping from the display screen. If the assigned storage mapping is not to be cleared, then the "NO" branch is taken and the method proceeds to block 320.

At block 345, the method applies the storage mapping accordingly. For example, if the storage mapping is to be applied to the compute sled and/or the compute slot and if the compute sled includes more than one compute node, then the method applies the storage mapping to each one of the compute nodes. After applying the storage mapping, the method proceeds to block 350 where the method removes the applied storage mapping from the queue of pending storage mappings. After removing the applied storage mapping from the queue, the method proceeds to decision block 355 where the method determines whether the queue of pending storage mappings is empty. If the queue of pending storage mappings is empty, then the method ends. If the queue of pending storage mappings is not empty, then the method proceeds to block 360 where the method retrieves the next pending storage mapping in the queue. The method then proceeds to block 320, where the method processes the next pending storage mapping in the queue.

Figure 4:
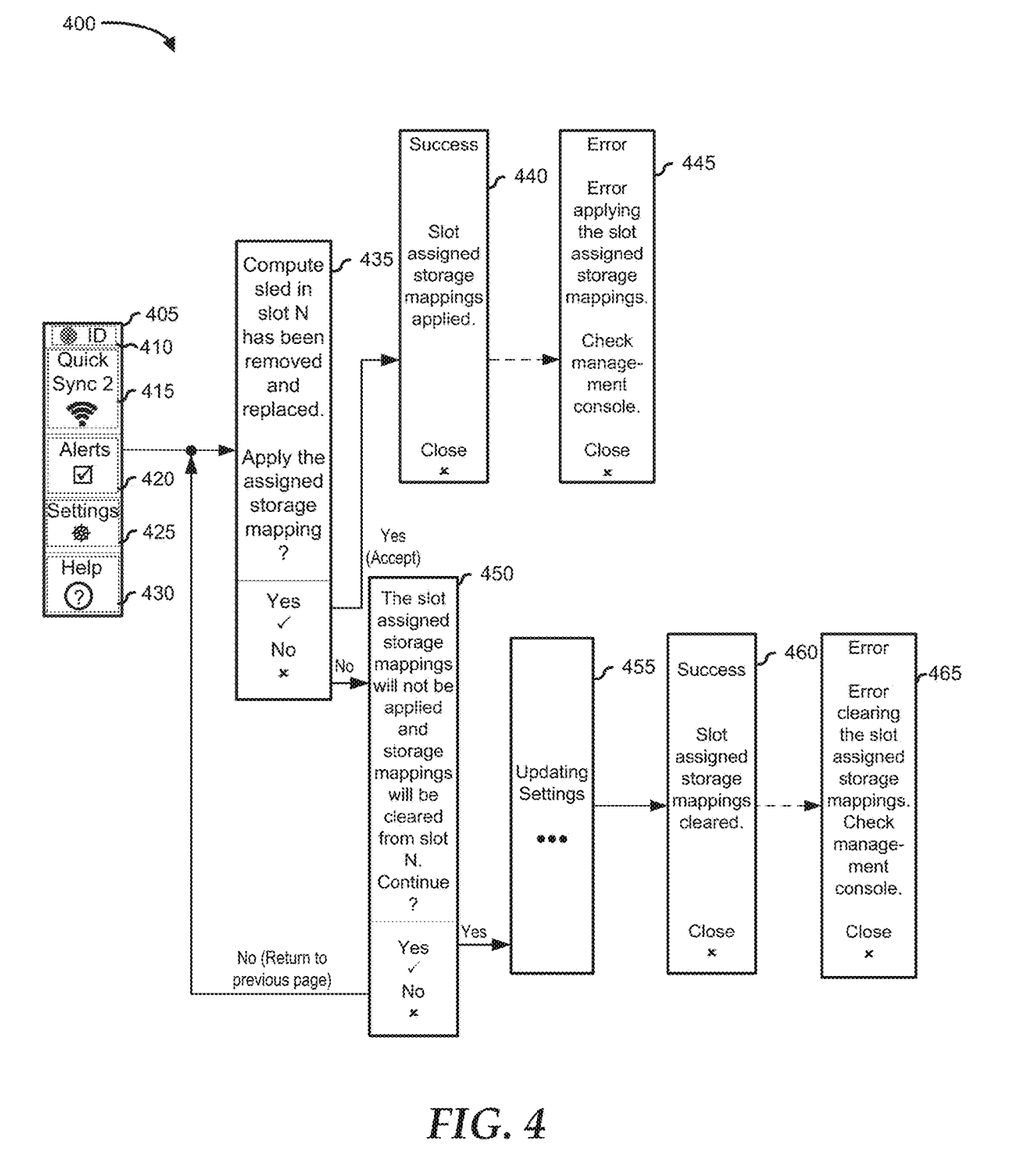
FIG. 4 is a page layout illustrating an example of storage mapping configuration notifications, according to an embodiment of the present disclosure.

FIG. 4 illustrates a wireframe 400 of notifications for dynamic at-the-box-storage mapping configuration. Wireframe 400 depicts a page layout or arrangement of the various notifications or pages in a physical user interface such as a front panel of a chassis. The physical user interface may be a liquid crystal display panel or a touchscreen display panel. Wireframe 400 typically starts on page 405 also referred to as a home page. Page 435, page 440, page 445, page 450, page 455, page 460, and page 465 may be associated with pending storage mappings associated with an addition, a removal, a replacement, of a sled. For example, page 435 may be shown after a physical action of inserting a compute sled or a storage sled in the chassis. Page 435 may also textually identify a slot where the compute sled or storage sled is inserted, such as a slot identifier. Page 435 may also display other information such as a compute sled or storage sled identifier. The aforementioned pages may also be associated with a change in the storage configuration of a sled. Further, the aforementioned pages may have a capacitive, touch-sensitive feature for the user to make a selection.

Page 405 may include various options such as option 410, option 415, option 420, option 425, and option 430. Option 410 may be a button or an indicator on the LCD panel to identify the chassis or choose a specific component to identify. For example, the LCD panel may show a chassis and/or a sled identifier when pressed. Option 415 may be a button/indicator that enables access to certain controls and connection information. For example, if enabled, option 415 may allow a user to manage the chassis using mobile devices. Option 420 may be a button/indicator that shows whether the chassis needs attention. For example, if option 420 is green, then the chassis has no degraded or critical alerts. In another example, if option 420 is amber, then the chassis has health alerts to be addressed. The user may press option 420 to identify the health alerts. For example, option 420 may be amber when there is a pending storage mapping to be resolved. The user may press option 420 to scroll through pending storage mappings. Option 425 may be a button/indicator that provides access to inventory and configuration data of the chassis. This may include network system, language settings, storage configuration, storage mapping, and system information such as model, asset tag, service tag, etc. Option 430 may be a button that shows information other than those shown by the other options. For example, option 430 may display a list of RACADM commands. In another example, option 430 may display support contact information.

Page 435 may be an initial page shown when there is a pending storage mapping waiting for user input. Page 435 is typically shown when a compute sled has been inserted in a compute slot and the chassis management controller determines that there is a compute slot assigned storage mapping that needs the user input. For example, a compute slot with a different service tag is inserted at a compute slot with a storage mapping assigned to compute sled previously occupying the compute slot. In another example, the user removed a compute sled containing the PERC with storage mappings and replaces it with a new compute sled having the HBA controller with a different service tag, page 435 may be shown to the user prompting the user to clear or accept the shared storage mapping. In addition, the power to the compute sled may be blocked by the chassis management controller until after the user makes a selection. After the selection, the chassis management controller may power on the compute sled. As illustrated, page 435 asks the user whether to apply the storage mapping. The storage mapping to be applied may be a currently assigned compute slot storage mapping. Page 435 gives the user an option "YES" that is to apply the storage mapping or "NO" that is not to apply the storage mapping. Prior to making a selection, the user may want to identify information regarding the storage mapping to be applied. In this regard, the user may press an option on page 435 or a button such as option 425 in the front panel to determine additional information.

Page 440 may be shown in the user interface panel after the user selects "YES" on page 435 and the application of the slot assigned storage mapping has been successful. Page 440 may wait for the user to click close before the user interface panel goes back either to page 405 or page 435 if there is another pending storage mapping to be applied. In another embodiment, page 440 may have a timer to switch to either page 405 or page 435 without user interaction. Page 445 may be shown in the user interface panel after the user selects "YES" on page 435 and the application of the storage mapping has been unsuccessful. Similar to page 440, page 445 may have a timer or wait for the user to click close prior to switching to page 405 or page 435.

Page 450 may be shown in the user interface panel after the user selects "NO" on page 435. Page 450 warns the user that the storage mappings will be cleared and awaits confirmation from the user whether to continue with the action. Page 450 gives the user an option "YES" that is to clear the storage mapping or "NO" that is not to clear the storage mapping. If the user selects "YES" on page 450, then page 455 may be shown while the chassis management controller is in the process of clearing the storage mapping. Page 455 may also be shown while the chassis management controller is in the process of assigning the storage mapping. After successfully clearing the storage mapping then page 460 may be shown. If the clearing of the storage mapping is unsuccessful, then page 465 may be shown instead.

Figure 5:
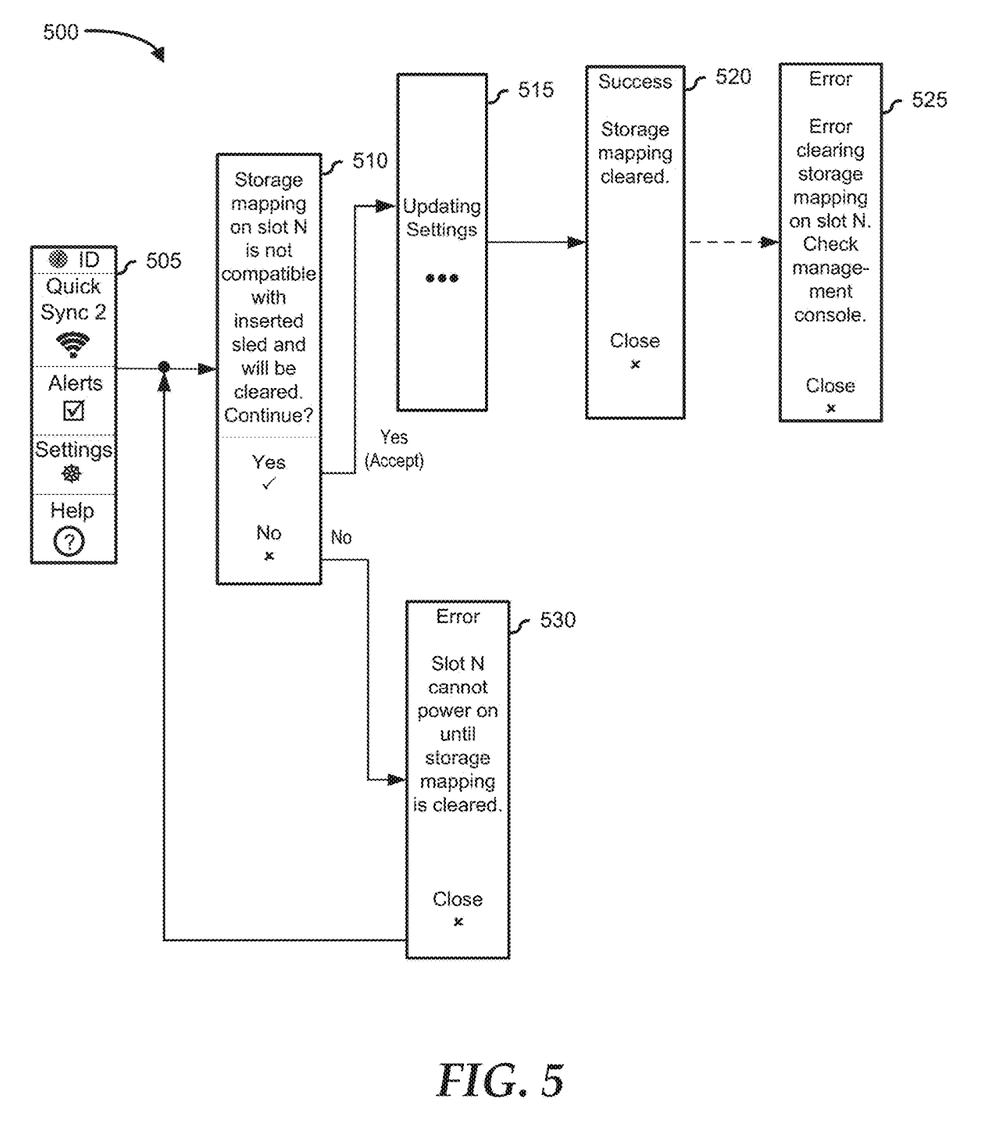
FIG. 5 is a page layout illustrating an example of storage mapping configuration notifications, according to an embodiment of the present disclosure.

FIG. 5 illustrates a wireframe 500 of notifications for dynamic at-the-box-storage mapping configuration. Wireframe 500 depicts a page layout or arrangement of the various notifications or pages in a physical user interface such as a front panel of a chassis. Wireframe 500 typically starts on page 505 also referred to as a home page similar to page 405 of FIG. 4.

Page 510 may be an initial page shown when there is a storage mapping waiting for user input and the inserted sled is not compatible with the currently assigned storage mapping. In one example, page 510 may be shown when there is a current slot assigned storage mapping and the user inserted a different sled to the slot, wherein the inserted sled is not compatible with the current slot assigned storage mapping. For example, when the user removes a compute sled containing the HBA controller with shared storage mappings and replaces it with a compute sled containing a PERC, the replacement compute sled is checked by the chassis management controller to ensure that no shared mapping exists. If a shared storage mapping exists, then page 510 may be shown prompting the user to clear the shared storage mapping. Page 510 gives the user an option "YES" that is to clear the storage mapping or "NO" that is not to clear the storage mapping. At this point the replacement compute sled may be turned off by the chassis management controller. If the shared storage mapping does not exist, then the replacement compute slot may be automatically powered on by the chassis management controller. Prior to making a selection, the user may want to identify information regarding the storage mapping to be cleared. In this regard, the user may press an option on page 510 or a button such as option 425 of FIG. 4 in the front panel to determine additional information.

Page 520 may be shown in the user interface panel after the user selects "YES" on page 510 and the clearing of the slot assigned storage mapping has been successful. Similar to page 440 of FIG. 4, page 520 may have a timer or wait for the user to click close prior to going to page 505 or page 510. Page 525 may be shown in the user interface panel after the user selects "YES" on page 510 and the clearing of the storage mapping has been unsuccessful. Similar to page 520, page 525 may have a timer or wait for the user to click close prior to going to page 505 or page 510. Page 515 may be shown in the user interface panel while the chassis management controller is in the process of clearing the storage mapping. Page 530 may be shown in the user interface panel after the user selects "NO" in page 510 warning the user that the slot cannot be powered on until the current pending storage mapping is cleared. Similar to page 520, page 530 may have a timer or wait for the user to click close prior to going to page 505 or page 510.

Figure 6:
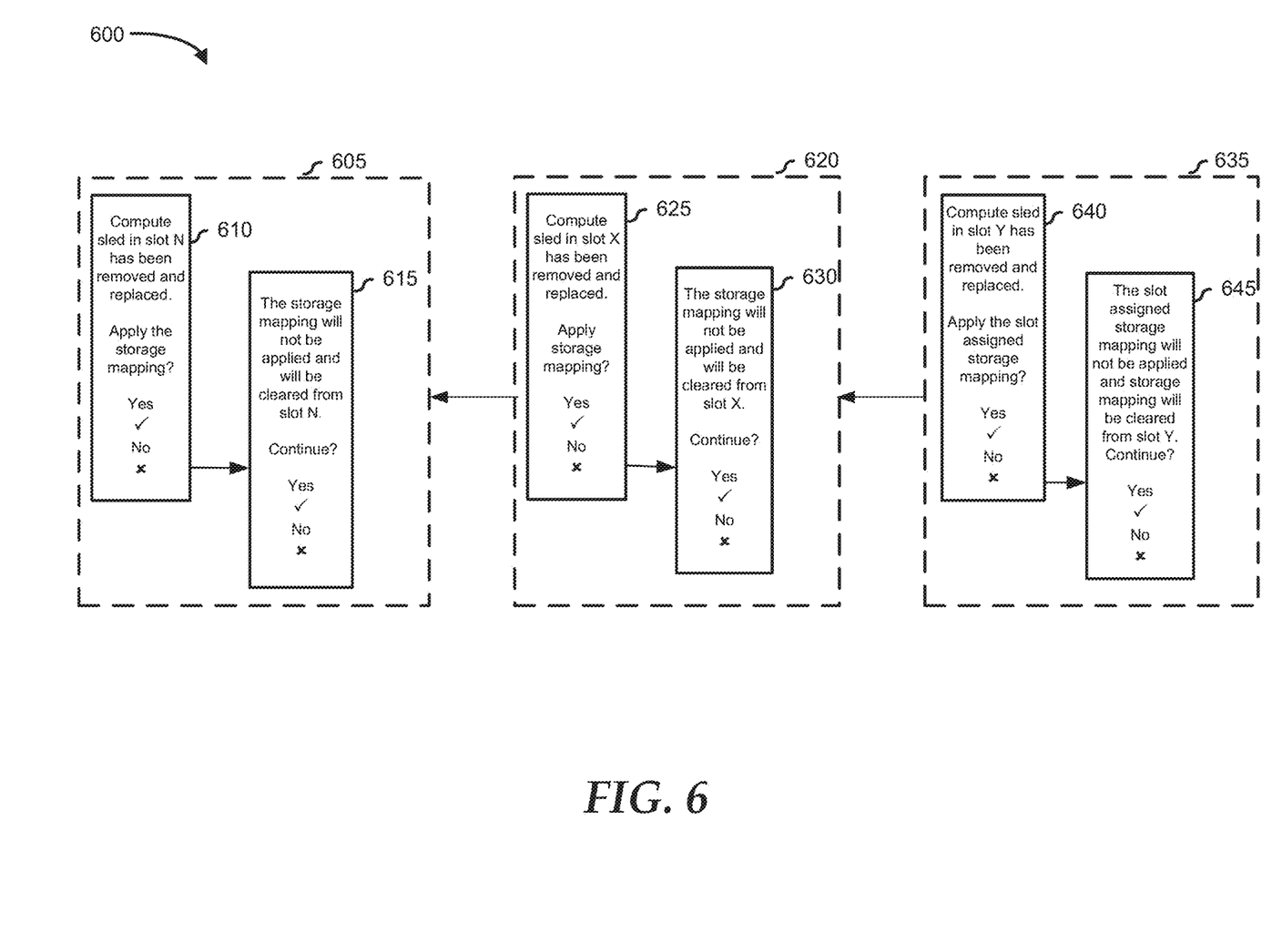
FIG. 6 is block diagram illustrating an example of a queue of pending storage mapping configurations, according to an embodiment of the present disclosure.

FIG. 6 illustrates a queue 600 of pending storage mappings. Because the chassis may have several sleds as depicted in FIG. 2, the user may replace more than one sled at a time. That is, the user may pull a first and second compute sled from the chassis, thus causing storage mappings for the first and the second compute sled to be queued by the chassis management controller. In another example, the user may process the storage mapping associated with the first compute sled and then pull a third compute sled from the chassis before processing the second compute sled. Thus, the storage mapping associated with the third compute sled is added to the queue.

Queue 600 depicts three pending storage mappings that are queued in the background in the order of received by the chassis management controller. That is, storage mapping 605 was received first, which is the oldest pending storage mapping and is in the front of the queue. The chassis management controller may use a timestamp of the pending storage mappings to determine the order. The pending storage mapping in the front of the queue may be referred to as a current pending storage mapping. When a user takes an action, that is to accept or clear the current pending storage mapping, the current pending storage mapping request is removed from the queue and is replaced by the next pending storage mapping in the queue. As shown, the pending storage mappings are illustrated as a pair of pages ordered from left to right, that is the first pending storage mapping in the queue is on the left, followed by a second pending storage mapping in the queue shown in the middle while the last pending storage mapping is shown on right. For simplicity of illustration and not to limit the current disclosure, the second page of each of the storage mappings is a page after the user selects the "NO" option on the first page. Additional pages if any are not shown. The user may select an option by touching or pressing that option, such as "NO" on the page. The chassis management controller applies the action indicated on the page associated by the selected option.

Queue 600 includes storage mapping 605, storage mapping 620, and storage mapping 635. Storage mapping 605 includes page 610 and page 615. Page 610 provides an option for the user whether to apply the current pending storage mapping. After the user selects the "NO" the user interface shows page 615 where the user is presented an option whether to clear the current pending storage mapping or not. Additional page(s) if any after user selection is not shown. After successfully processing storage mapping 605, it is removed from queue 600 and the current page goes away.

After successfully removing storage mapping 605 from queue 600, the user interface panel displays page 625 of storage mapping 620 which is the next storage mapping in queue 600. Page 625 provides an option for the user whether to apply the current pending storage mapping. After the user selects the "NO" user interface shows page 630 where the user is presented whether to clear the current pending storage mapping. Additional page(s) if any after user selection is not shown. After successfully processing storage mapping 620, it is removed from queue 600 and the current page goes away.

After successfully removing storage mapping 620 from queue 600, the user interface panel displays page 640 of storage mapping 635 which is the next pending storage mapping in queue 600. Page 640 provides an option for the user whether to apply the current pending storage mapping. After the user selects the "NO" user interface panel displays page 645 where the user is presented whether to clear the current pending storage mapping. Additional page(s) if any after user selection is not shown. After successfully processing storage mapping 635, it is removed from queue 600 and the current page goes away. This goes on until queue 600 is empty and the user interface shows a home page similar to page 405 of FIG. 4.

Although FIG. 3 shows example blocks of method 300 in some implementation, method 300 may include additional blocks, fewer blocks, different blocks, or differently arranged blocks than those depicted in FIG. 3. Additionally, or alternatively, two or more of the blocks of method 300 may be performed in parallel. For example, block 340 and block 350 may be performed in parallel.

Although FIG. 6 shows queue 600 in some implementation, this illustration should not be considered limiting as to the scope of the current disclosure. The pending storage mappings may be ordered in a different form of data structure such as a list, a linked list, an array, a heap, etc. In addition, based on the data structured to be used, processing of pending storage mappings may not be sequential or serialized as depicted. The user may be able to select the pending storage mapping to be processed first. For example, the user may process storage mapping 620 before processing storage mapping 605.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

Devices, modules, resources, or programs that are in communication with one another need not be in continuous communication with each other unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, by an embedded controller, a first event notification of an insertion of a first compute sled in a first slot in a chassis, wherein the first event notification of the insertion includes a power on request from the first compute sled;
   in response to determining that the first compute sled is a replacement to a prior compute sled that was removed from the first slot in the chassis, and wherein there is a potential data loss if the first compute sled is powered on:
      determining a first pending storage mapping associated with the prior compute sled that was removed from the first slot, wherein the first pending storage mapping is the first pending storage mapping of one or more pending storage mappings;
      generating a graphical user interface to configure the one or more pending storage mappings, wherein the graphical user interface of includes the first pending storage mapping associated with the prior compute sled that was removed from the first slot;
      determining whether to reinstate the first pending storage mapping to the first compute sled; and
      in response to determining to reinstate the first pending storage mapping, reinstating the first pending storage mapping to the first compute sled in the first slot; and in response to determining that there is none of the one or more pending storage mappings remaining to be resolved for the first compute sled, powering-on the first compute sled based on the power on request.

2. The method of claim 1, further comprising displaying the graphical user interface indicating an option whether to apply the first pending storage mapping or not.

3. The method of claim 1, further comprising displaying the graphical user interface indicating an option whether to clear the first pending storage mapping or not.

4. The method of claim 1, wherein the potential data loss is based on whether the first compute sled in the chassis has a first service tag that is different than a second service tag of the prior compute sled.

5. The method of claim 1, wherein the graphical user interface is displayed at a display panel in the chassis.

6. The method of claim 1, wherein the graphical user interface includes information associated with the first compute sled or the first slot.

7. The method of claim 1, wherein the first pending storage mapping is a slot assigned storage mapping.

8. The method of claim 1, further comprising receiving a second event notification of another insertion of a second compute sled in a second slot in the chassis.

9. The method of claim 8, further comprising adding a second pending storage mapping associated with the second event notification to a queue of the one or more pending storage mappings associated with the chassis.

10. The method of claim 9, further comprising in response to a user action, removing the first pending storage mapping from the queue of pending storage mappings associated with the chassis.

11. A system, comprising:
a first embedded controller configured to the system via a management interface displayed at a mobile device;
a second embedded controller configured to manage a display panel at the system, wherein the second embedded controller is distinct from the first embedded controller;
receiving, by the first embedded controller, a first event notification of an insertion of a compute sled in the system, wherein the first event notification of the insertion includes a power on request from the compute sled;
in response to the receiving of the first event notification, determining a pending storage mapping associated with a prior compute sled in the system and determining whether to power on the compute sled based on the power on request;
in response to determining that the compute sled is a replacement to the prior compute sled that was removed from the system, and wherein there is potential data loss if the compute sled is powered on:
displaying, by the first embedded controller at the management interface at the mobile device, information associated with the pending storage mapping associated with the prior compute sled, wherein the pending storage mapping is one of one or more pending storage mappings;
generating, by the second embedded controller, a graphical user interface to configure the one or more pending storage mappings, wherein the graphical user interface includes the information associated with the pending storage mapping associated with the prior compute sled, wherein the graphical user interface is displayed at the display panel;
receiving a user input associated with the pending storage mapping at the management interface;
in response to determining that the user input is to apply the pending storage mapping of the prior compute sled to the compute sled inserted in the system; and
updating the graphical user interface in response to the user input; and
in response to determining that there is no pending storage mapping to be resolved for the compute sled, powering on the compute sled based on the power on request.

12. The system of claim 11, further comprising in response to receiving the user input associated with the pending storage mapping, disallowing the compute sled to boot.

13. The system of claim 11, further comprising in response to receiving the user input associated with the pending storage mapping, sending a second event notification to the second embedded controller.

14. The system of claim 11, further comprising synchronizing the information associated with the pending storage mapping between the first embedded controller and the second embedded controller.

15. A memory device storing instructions that when executed cause a hardware processor to perform operations, the operations comprising:
receiving an event notification of an insertion of a compute sled in a slot of a chassis, wherein the event notification of the insertion includes a power on request from the compute sled;
in response to determining that the compute sled is a replacement to a prior compute sled that was removed from the slot in the chassis and that there is potential data loss when the compute sled is powered on:
determining that a pending storage mapping associated with the prior compute sled on the slot is not compatible with the compute sled currently inserted in the slot of the chassis, wherein the pending storage mapping is one of one or more pending storage mappings;
generating a graphical user interface for configuring the one or more pending storage mappings, wherein the graphical user interface includes information associated with the pending storage mapping;
displaying the graphical user interface at a display panel, the graphical user interface providing a first option to clear the pending storage mapping; and
clearing the pending storage mapping in response to a user action to clear the pending storage mapping; and
in response to determining that there is no pending storage mapping in the one or more pending storage mappings for resolution, powering on the compute sled based on the power on request.

16. The memory device of claim 15, wherein the operations further include displaying the graphical user interface providing a second option to not clear the pending storage mapping.

17. The memory device of claim 15, wherein the operations further include blocking power to the compute sled until the pending storage mapping is resolved.

18. The memory device of claim 15, wherein the potential data loss is associated with the insertion of the compute sled with a first serial tag that is different than a second serial tag of the prior compute sled.

19. The memory device of claim 15, wherein the operations further include in response to the user action, removing the pending storage mapping from a queue of pending storage mappings.

20. The memory device of claim 15, wherein the operations further include in response to the user action, removing the graphical user interface from the display panel of the chassis.

* * * * *

UNITED STATES PATENT AND TRADEMARK OFFICE
CERTIFICATE OF CORRECTION

| | | |
|---|---|---|
| PATENT NO. | : 11,347,675 B2 | Page 1 of 1 |
| APPLICATION NO. | : 16/793396 | |
| DATED | : May 31, 2022 | |
| INVENTOR(S) | : Christopher Abella Poblete et al. | |

It is certified that error appears in the above-identified patent and that said Letters Patent is hereby corrected as shown below:

In the Claims

Column 18, Line 60: Please change "interface of includes" to --interface includes--

Signed and Sealed this
Second Day of August, 2022

Katherine Kelly Vidal
*Director of the United States Patent and Trademark Office*